Nov. 27, 1962   B. B. PASQUINELLI   3,065,692
UNITARY AND REMOVABLE INKING MECHANISM FOR PRINTING PRESSES
Filed Nov. 23, 1960   4 Sheets-Sheet 1
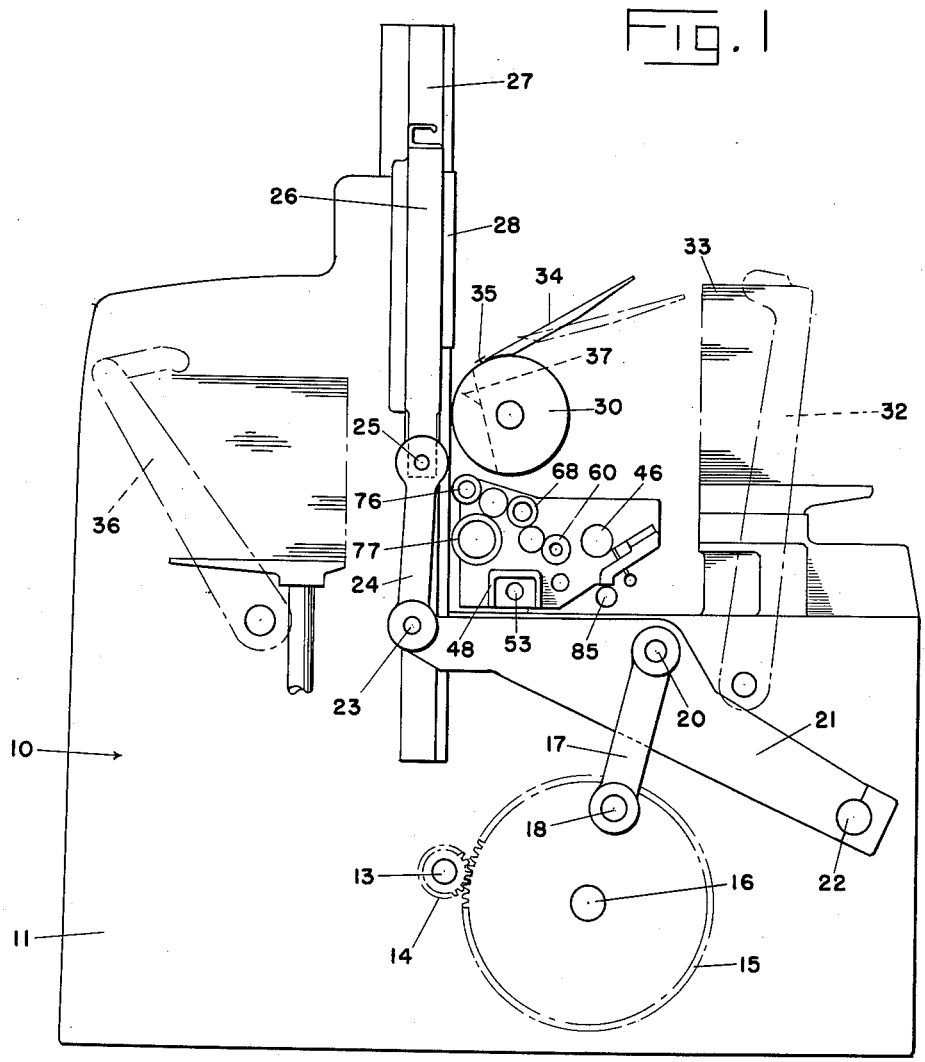
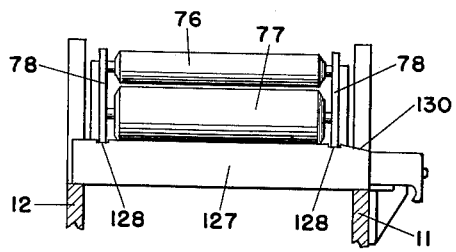
INVENTOR.
BRUNO B. PASQUINELLI
BY
Byron Hume Groen & Clement
ATTORNEYS Nov. 27, 1962 B. B. PASQUINELLI 3,065,692
UNITARY AND REMOVABLE INKING MECHANISM FOR PRINTING PRESSES
Filed Nov. 23, 1960 4 Sheets-Sheet 2
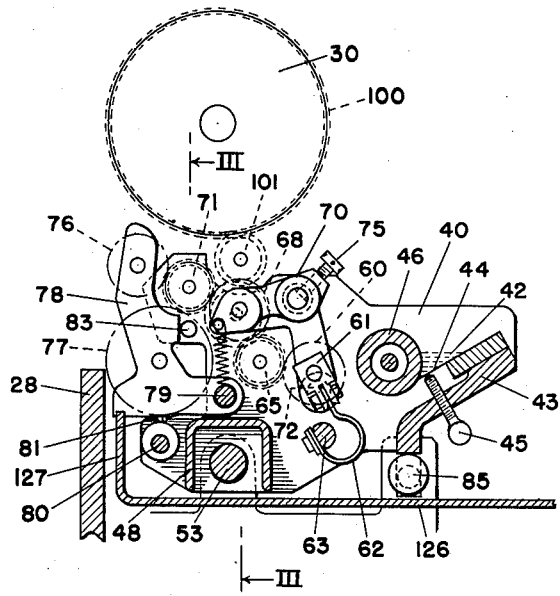
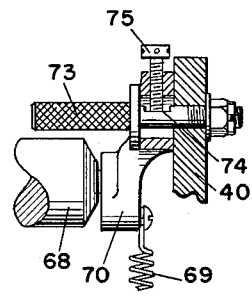
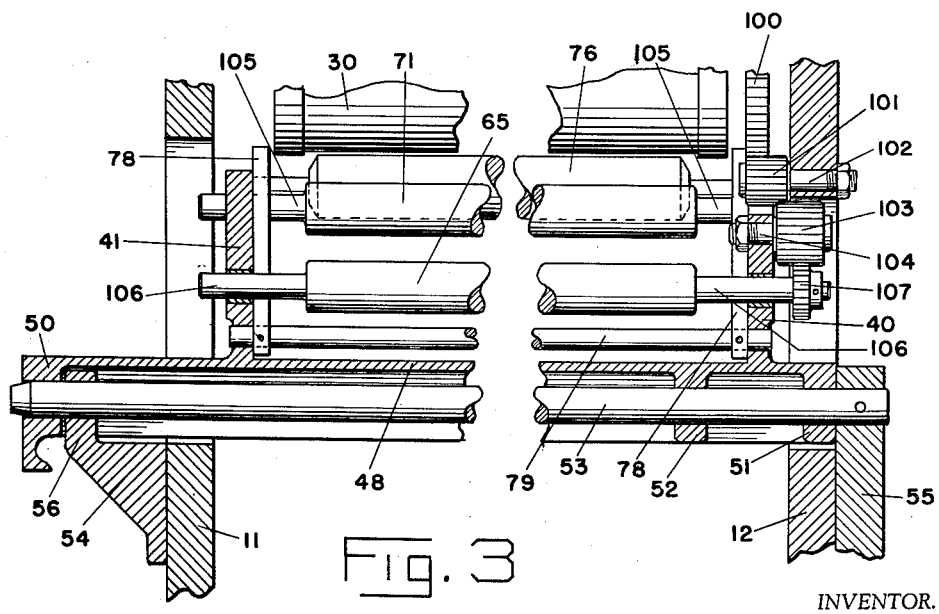
INVENTOR.
BRUNO B. PASQUINELLI
BY
*Byron Hume Groen & Clement*
ATTORNEYS Nov. 27, 1962 B. B. PASQUINELLI 3,065,692
UNITARY AND REMOVABLE INKING MECHANISM FOR PRINTING PRESSES
Filed Nov. 23, 1960 4 Sheets-Sheet 3
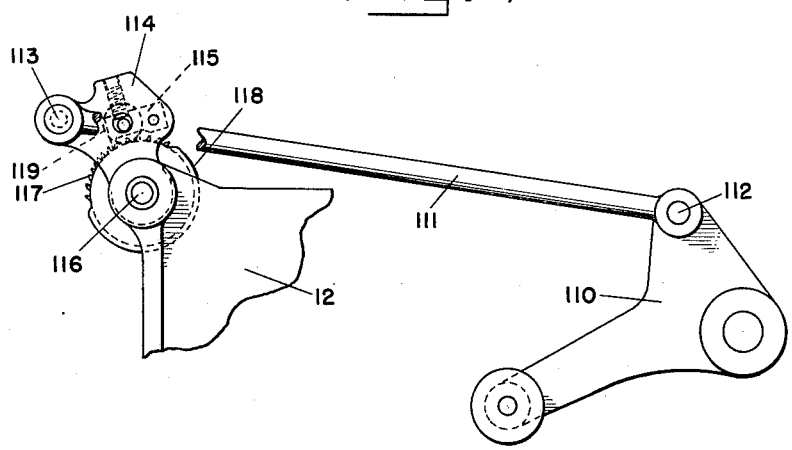
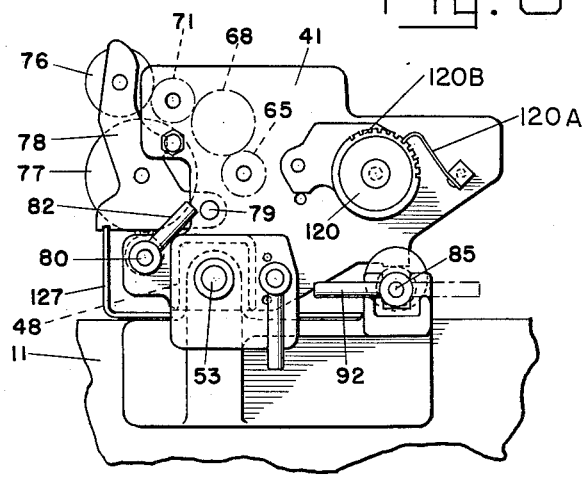
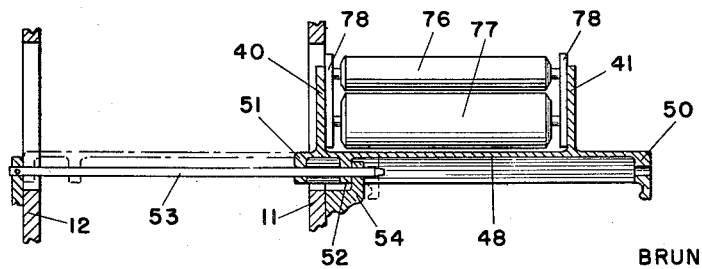
INVENTOR.
BRUNO B. PASQUINELLI
BY
*Byron Hume Groen & Clement*
ATTORNEYS Nov. 27, 1962  B. B. PASQUINELLI  3,065,692
UNITARY AND REMOVABLE INKING MECHANISM FOR PRINTING PRESSES
Filed Nov. 23, 1960 4 Sheets-Sheet 4
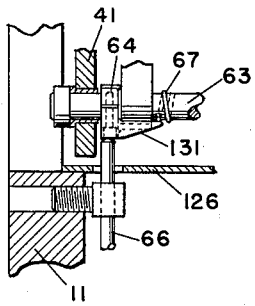
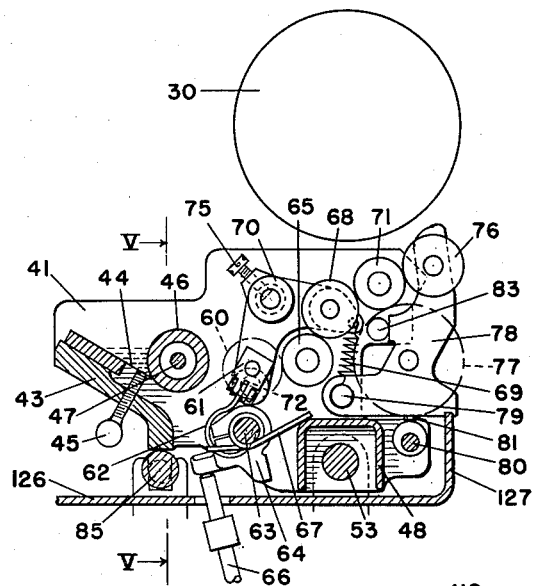
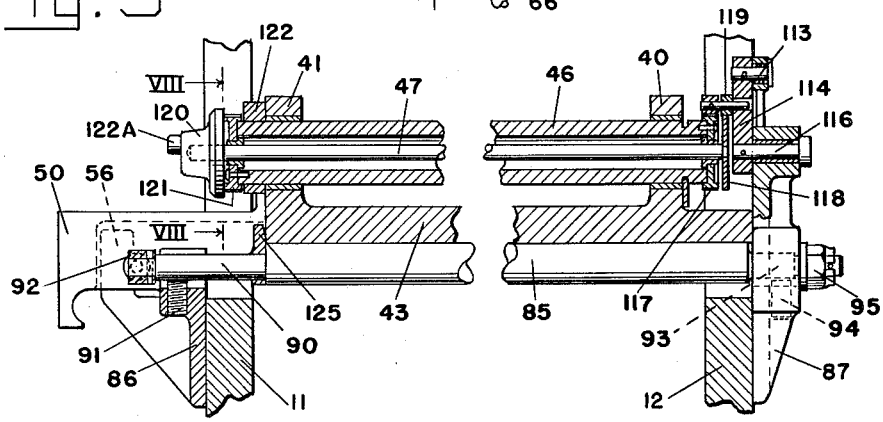
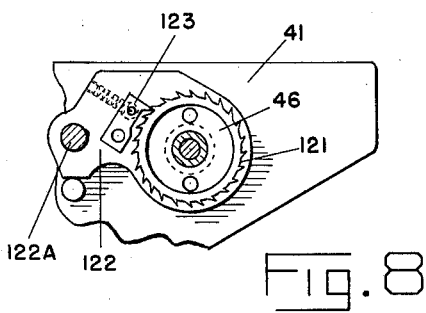
INVENTOR.
BRUNO B. PASQUINELLI
BY
Byron Hume Groen & Clement
ATTORNEYS United States Patent Office 3,065,692
Patented Nov. 27, 1962

3,065,692
UNITARY AND REMOVABLE INKING MECHANISM FOR PRINTING PRESSES
Bruno B. Pasquinelli, Evergreen Park, Ill., assignor to Miehle-Goss-Dexter, Incorporated, Chicago, Ill., a corporation of Delaware
Filed Nov. 23, 1960, Ser. No. 71,356
22 Claims. (Cl. 101—357)

The invention relates to inking mechanisms for printing presses and has reference more particularly to an improved inking assembly that can be withdrawn laterally as a unit beyond the press frame for convenience of adjustment and normal maintenance.

In a printing press, the location and particularly the accessibility of the inking mechanism for adjustment of the various elements and removal and replacement of the inking rollers is an important factor which has an influence not only on the quality of the work produced, but also on the production costs.

In the normal operation of a printing press the quality of the work produced is dependent to a great extent upon the accuracy with which the various elements of the inking mechanism are adjusted. The respective rollers, for example, must be accurately aligned and they must also be set with a predetermined uniform pressure therebetween so that the ink will be distributed in a uniform manner over the entire surface of the form.

Such adjustments are usually made before each job is started, but frequent readjustments are often required during a run. This is due primarily to changes which take place in the physical characteristics of the composition rollers which may be caused by excessive heat, wear or the affect on the rollers of the various solvents used. Moreover, if the range of adjustment provided by the mechanism is not adequate to fully compensate for such variations in the rollers, it is often necessary to replace the defective rollers. This, of course, involves resetting the alignment and pressure relation of the new roller with respect to the coacting rollers.

It will also be appreciated that whenever a new job is to be printed with a different color ink, it is usually necessary to remove, clean and replace all of the inking rollers. The ink fountain must also be thoroughly cleaned so that no trace of the ink from the preceding job will remain to mar the new prints.

Unless such adjustments and the removal and replacement of the rollers can be made quickly and efficiently, it is obvious that considerable time will be lost in performing these functions and this in turn will add to the overall production cost. Not only will the cost be increased, but it also is an established fact that when the required adjustments are inconvenient and difficult to make, the average pressman is apt to be less critical about the roller settings. Under such circumstances, the inking mechanism will not perform its function in an efficient manner and the quality of the work produced will leave much to be desired.

It is exceedingly important, therefore, that the inking assembly, particularly in a small, compact job press, be constructed and arranged in such manner that it will be in, or be conveniently movable to, a position wherein it is readily accessible to the operator.

A primary object of the invention, therefore, is to provide an improved unitary assembly which is slidably mounted in the frame of the printing press, so that the inking assembly, as a unit, can be withdrawn from its operative position within the press to an exterior position beyond the press frame wherein it is conveniently accessible for adjustment and maintenance.

Another object of the invention is to provide a complete and operative inking assembly including an ink fountain, a fountain roller and the conventional ductor, vibrating, distributing and inking rollers, and wherein the said assembly will be substantially removable from one side of the press to facilitate repairs, replacement and maintenance of the several elements of the assembly.

A further object is to provide an inking mechanism particularly designed for printing presses of the small and compact type and which will be removable from the press as a unit, whereby retraction of the unitary inking mechanism does not affect the alignment or adjustment of the rollers of the mechanism and also said retraction does not disturb the other working parts of the press.

Another object of the invention is to provide an operative and unitary inking assembly that can be slidably moved to and from an operative position within the press and a retracted exterior position, and wherein the assembly will automatically engage and disengage with the actuating means therefor as provided by the press when the assembly is moved between operative and retracted positions.

Another object of the invention is to provide an operative and unitary inking assembly that can be slidably moved to and from an operative position within the press and a retracted exterior position, and wherein improved means are incorporated as safety features whereby the form inking rollers are withdrawn from the type form before the assembly can be retracted.

A still further object is to provide an operative and unitary inking assembly as described which will embody novel and improved structure for relieving the pressure between the composition form inking roller and the vibrating rollers following retraction of the assembly and wherein additional safety means are also provided to prevent the return of the assembly to its operative position within the press until the pressure relation is reestablished as regards the form and vibrating rollers.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts:

FIGURE 1 is a schematic side elevational view of a printing press embodying the improvements of the invention;

FIGURE 2 is a longitudinal sectional view of the inking assembly showing details of the same and its associated relation with the impression cylinder;

FIGURE 3 is a transverse sectional view taken substantially along lines 3—3 of FIGURE 2;

FIGURE 4 is a view similar to FIGURE 2 but looking at the opposite side of the inking assembly;

FIGURE 5 is a longitudinal sectional view taken substantially along line 5—5 of FIGURE 4, and showing the construction of the fountain roller, its drive mechanism and the eccentric positioning means for the inking assembly;

FIGURE 6 is an end elevational view of the inking unit showing the various manual controls for locking the unit in place within the press and for releasing the unit so that it can be retracted;

FIGURE 7 is a fragmentary side view showing the fountain roller drive mechanism;

FIGURE 8 is a fragmentary side view of the opposite end of the fountain roller taken substantially along line 8—8 of FIGURE 5;

FIGURE 9 is a fragmentary sectional view illustrating the inking assembly in a retracted position;

FIGURE 10 is a view of the front of the inking assembly looking to the right in FIGURE 2 and showing the safety means for the form inking rollers.

FIGURE 11 is a fragmentary sectional view showing the adjustable mounting for the distributing roller; and FIGURE 12 is a fragmentary sectional view showing the drive for oscillating the ductor roller.

It will be understood that the principle of the present invention is conveniently adaptable to almost any type of printing press including flat beds, platens and rotary presses. Therefore, although I have chosen to illustrate my invention as embodied in a flat bed press of the vertical type, this is not to be regarded as a limitation in any respect.

Referring to FIGURE 1 of the drawings, the printing press selected for illustrating the invention comprises a frame structure identified by numeral 10 and having side frames 11 and 12 which journal the main drive shaft 13. The pinion 14 is mounted on said drive shaft and the pinion meshes with gear 15 on shaft 16. The link 17 is pivotally connected to the gear at 18 and said link at 20 is connected to the oscillatable lever 21 pivotally mounted on the frame structure at 22. The free end of the oscillatable lever 21 has pivotal connection at 23 with a second link 24 which connects at 25 with the type bed 26 supported for vertical reciprocating movement in the guideways 27. A type form such as 28 is carried by the bed and said form coacts with the rotatable impression cylinder 30 to provide a printing couple therewith. The oscillating feeding arms 32 of the feeding device carry the conventional suction means for picking up the top sheet from the feeder pile 33 and said arms have oscillating movement to present the sheet to the transfer table 34 for registration. The sheet is then delivered to the grippers 35 of the impression cylinder 30 and the sheet is printed as the type form 28 moves on its downward printing stroke. The transfer table 34 assumes the dotted line position of FIGURE 1 during the printing action of the printing couple. Before the type form returns on its upward or non-printing stroke, the oscillating delivery arms 36 move over the bed and take the sheet from the impression cylinder. The impression cylinder 35 rotates intermittently in timed relation with the reciprocating movements of the type form, and the cylinder has a gap opening 37 which is positioned as shown in FIGURE 1 at the end of the printing cycle so that the impression cylinder does not interfere with the non-printing upward stroke of the type form.

From the foregoing it will be appreciated that the inking assembly is inaccessible, being substantially surrounded by the feeder, the type bed, the impression cylinder and other parts of the press. It is, therefore, desirable to have the inking assembly removable from the press frame as a unit to thus provide easy access to the said unit for convenient adjustment of the several parts, for cleaning and for general maintenance.

The unitary and removable inking assembly of the invention, as best shown in FIGURES 2, 3 and 4, includes the spaced side members 40 and 41 and a bottom wall 43 which supports the members to which the ink fountain blade 44 is secured. The adjusting screws 45 for the fountain blade are threaded in the bottom wall. The blade 44 engages the periphery of the fountain roller 46 which is suitably journalled for intermittent rotation in the side members 40 and 41 of the inking unit. The center shaft 47, FIGURE 5, extends through the hollow fountain roller and the same is associated with the drive for the roller, as will be presently described in detail. The spaced side members 40 and 41 are connected by the inverted, transverse channel member 48, having the end flanges 50 and 51 and the intermediate partition wall 52. The end flanges 50 and 51 and the partition wall ride on the fixed shaft 53 which extends transversely of the press frame, being fixed at its respective ends to the frame supported brackets 54 and 55. Bracket 54 provides the end wall 56 which is disposed within the inverted channel and on the inside of the end flange 50. This structure enables the inking assembly to be slidably moved as a unit on shaft 53 until the partition wall 52 contacts end wall 56, in which position of the parts the inking assembly will be retracted from the press, the same projecting from the side frame member 11, whereby to provide convenient access to the pressman for maintenance, repair and replacement of the various working parts of the inking assembly. The retracted position of the inking assembly is best illustrated in FIGURE 9.

In addition to the fountain roller 46, the working parts of the inking assembly include the oscillatable ductor roller 60, FIGURES 2 and 4, which is journalled at respective ends in socket members 61, the socket members being respectively secured to the free ends of the resilient members 62. Said resilient members are, in turn, fixed to the oscillatable shaft 63 rotatably mounted in the side members 40 and 41 and having secured thereto member 64 as shown in FIGURE 4. The member 64 is part of the oscillating drive means for the ductor roller 60 which is accordingly oscillated between the fountain roller 46 and the first vibrating roller 65 so as to transfer ink from the fountain roller to the first vibrating roller. The printing press provides the rod 66 which is reciprocated during operation of the press to actuate the member 64 and thus oscillate the shaft 63. The said shaft is tensioned by the spring member 67 which yieldingly biases the shaft to maintain the ductor roller in contact with the fountain roller. The reciprocating rod 66 thus moves the ductor roller into contact with the first vibrating roller 65 and the spring member 67 returns the same.

The first vibrating roller 65 has a metal periphery and the same is mounted for rotation in the side members of the inking unit. The said roller is caused to vibrate along with its rotation in the conventional manner effecting axial back-and-forth movement to thus facilitate distribution of the ink applied thereto by the ductor roller. The distributing roller 68 is carried by the yoke members 70, being journalled by the upper arms of the yoke members for rotation. The depending arms of the said yoke member are pivotally supported by the stud shafts 72 which project inwardly from the side members respectively, as shown in FIGURES 2 and 4. The yoke structure is thus mounted for limited oscillating movement to enable the distributing roller to be withdrawn from the vibrating rollers 65 and 71 and which action is effected by the structure shown in FIGURE 11. The knurled shafts 73 are each rotatably mounted in a side member and the same project through an opening in an arm of the yoke structure. Each shaft 73 is cut away to provide a flat surface 74 which is respectively engaged by a threaded locking screw 75 carried by a side member of the inking assembly. Upon rotation of the knurled shafts 73 the yoke structure is oscillated to an extent sufficient to withdraw the distributing roller against the tension of spring 69 for relieving the pressure contact thereof with the first and second vibrating rollers. This action is desirable during shut down periods of the press since otherwise the composition material of the distributing roller would develop flat areas due to its pressure contact with the vibrating rollers.

The ink is supplied by the second vibrating roller 71 to the composition form inking rollers 76 and 77. The form inking rollers differ in diameter to insure the best distribution of the ink over the printing form 28. Both said form inking rollers are journalled in the side plates 78 which are pivotally mounted in the inking unit by the shaft 79. The eccentric shaft 80, also suitably mounted by the inking unit for rotation, is operatively associated with side plates 78 by means of the adjusting screws 81. Upon retraction of the inking unit from the press the eccentric shaft can be rotated by actuation of handle 82, FIGURE 6, to thus free the side plates which permits the form inking rollers to move out of pressure contact with the second vibrating roller. However, during operation of the press, the handle 82 is positioned as shown and the plates may be caused to contact the stop 83. Minor adjustment of the pressure exerted on the side plates 78 by the eccentric shaft 80 is possible by adjustment of the screws 81.

Before the inking assembly can be retracted from its operative position in the frame of the printing press, it will be understood that the form inking rollers must be withdrawn from the inking position with respect to the type form, and this is accomplished by a second eccentric shaft 85, FIGURE 5, mounted by the side frames 11 and 12 of the press. Brackets 86 and 87 are fixed to the side frames, respectively, for accommodating the reduced ends of the shaft. End 90 is received by bracket 86 and the said end is supported by the set screw 91. The handle 92 is secured to this end of the eccentric shaft so that by actuating the handle the pressman can rotate the shaft. End 93 is received by bracket 87 and in a similar manner the end is supported by the set screw 94. The nut 95 is located on this end of shaft 85, and which shaft has an eccentric portion between the said ends for contact with the bottom wall 43 of the inking unit. By rotation of the shaft 85, the reservoir end of the inking assembly can be dropped to a limited extent, the unit having pivotal movement on shaft 53 and thus the form inking rollers 76 and 77 will be withdrawn a sufficient distance from the type form 28 to permit the pressman to retract the inking assembly. When this is accomplished the other operations can be effected to relieve pressure contact on the rollers such as actuation of the eccentric shaft 80 and actuation of the knurled studs 73.

In accordance with the invention certain improvements are associated with the gear drive for the vibrating rollers, whereby the drive is automatically engaged and disengaged as the inking unit is moved into and from the press. As best shown in FIGURE 3 the impression cylinder gear 100 has meshing relation with a first pinion 101 rotatably mounted on the stud shaft 102, suitably secured to the side frame 12 of the press. The first pinion 101 meshes with a second pinion 103 which is rotatably mounted by the stud shaft 104, the same being suitably secured to the side member 41 of the inking unit. The first and second vibrating rollers 65 and 71 are provided with reduced end portions by means of which the rollers are journalled, namely 105 and 106, respectively. As illustrated in FIGURE 3 the right hand journalling portion of each roller is equipped with a pinion 107, the same being adapted to mesh with the second idler pinion 103 when the inking unit is in operative position within the printing press. In this manner the vibrating rollers are positively driven from the impression cylinder gear which rotates continuously during the printing periods of the press, although as previously explained the impression cylinder rotates intermittently. More specifically the impression cylinder and the cylinder gear are locked together on the down printing stroke and both rotate since the cylinder gear meshes with the rack on the type bed. The impression cylinder is released on the upward non-printing stroke and thus the cylinder gear rotates alternately in a clockwise and then a counter-clockwise direction.

In order to facilitate the re-engagement of the driving pinion 103 with the first pinion 101 when the inking unit is being returned to the press, it will be understood that said pinions have a rounded or bevelled edge on their entrance side. For example, pinion 103 has a rounded or bevelled edge on the right side thereof as seen in FIGURE 5, whereas pinion 101 is rounded or bevelled on the left side thereof.

The fountain roller 46 is intermittently driven from the printing press by means of a cam lever 110, FIGURE 7, which is suitably oscillated to cause reciprocation of the rod 111 pivoted to the lever at 112. The opposite end of the rod is pivoted at 113 to an oscillatable member 114 which pivotally carries a spring pressed actuating pawl 115. The said member 114 is rotatable on the stud shaft 116, which is suitably supported from the frame 12, FIGURE 5. The pawl is adapted to engage the teeth of the ratchet wheel 117 fixed to one end of the fountain roller. In connection therewith improvements are provided so that the pressman may vary the degree of engagement of the pawl with the ratchet wheel in order to vary the extent of intermittent rotation imparted to the roller. For this purpose the structure as described has associated therewith an annular guard plate 118, which is fixed to shaft 47 and angularly adjustable by rotation of said shaft. The shaft extends axially of the fountain roller and is journalled thereby for independent rotation. The guard plate 118 is fixed to the right hand extending end of the shaft 47, FIGURE 5, and a handle 120 is suitably fixed to the left hand extending end. By manipulating the handle 120, the shaft 47 can be rotated to adjustably position the guard plate 118. The pawl 115 carries the roller 119 and the guard plate 118 is adapted to engage the roller to lift the pawl when the said guard plate is interposed between the roller and the teeth 117 of the ratchet wheel. When the pawl 115 is lifted it is rendered inoperative as regards its contacts with the ratchet teeth and thus the angular positioning of the guard plate determines the extent of rotation imparted to the fountain roller. This adjustment as to the extent of intermittent rotation imparted to the fountain roller gives the pressman an opportunity to vary the ink supplied by the fountain roller. The handle 120 is adapted to be retained in its adjusted position by means of a spring member 120A that is mounted on the frame member 41 so as to engage the notches 120B provided on the periphery of the handle.

The pawl 115 is carried by the main frame of the press whereas the fountain roller and thus the ratchet wheel are journalled by the side frames of the inking assembly. Therefore, when the assembly is withdrawn from the press the parts are automatically and conveniently separated from one another. However, when the inking assembly is returned to within the press an operative relationship is again effected between the pawl and the ratchet wheel.

A second ratchet wheel 121 is fixed to the fountain roller 46 at its left hand end, FIGURES 5 and 8, and the actuating member 122 carries the latching pawl 123, the same having coaction with the teeth of the ratchet wheel 121 for preventing reverse movement of the fountain roller during retraction of the pawl drive mechanism. The member 122 is exteriorly supported on the fountain roller 46 for movement independently of the roller. The pressman can thus actuate the member 122 by means of handle 122a effecting oscillating movement of the same and thereby rotating the fountain roller for initially inking the roller, for cleaning the same or for other purposes. Since this hand actuated device for the roller is on the end opposite the intermittent operating pawl 115 and guard plate 118, the structure does not interfere with the normal operation of the roller.

Before the inking assembly can be retracted, it is necessary to withdraw the form inking rollers 76 and 77 from their operative position with respect to the type form 28. This is done by rotating shaft 85 through means of handle 92. The locking flange 125 suitably fixed to reduced end 90 of said shaft 85 is accordingly rotated out of contact with side member 40 of the inking unit. Since the said unit has now been inoperatively positioned and unlocked, the same can be withdrawn from the printing press, thereby presenting all the working parts of the inking assembly for convenient access. This materially facilitates any repairs or replacements that have to be made to the inking assembly, and also facilitates the adjustment and maintenance of the rollers for the most efficient printing operations. The locking flange 125 when operatively positioned following return of the inking unit within the press, functions to securely hold the unit between the frame 12 and the said locking flange, thereby preventing any lateral movement or vibration thereof during operation of the press.

During non-printing periods of the press such as may occur overnight and the like, it is necessary to relieve the pressure contact on the various inking rollers. With respect to the form inking rollers, this is accomplished by rotating eccentric shaft 80, thereby relieving the plates 78, allowing them to pivot on shaft 79 as an axis. The form inking rollers thereby move out of pressure contact with the second vibrating roller 71. The distributing roller 68 may also be moved out of pressure contact with the second vibrating roller 71. The distributing roller 68 may also be moved out of pressure contact with the vibrating rollers 65 and 71. This is accomplished by rotating the knurled studs 73 which withdraws the distributing roller 68 from the said vibrating rollers.

The invention provides certain safety features which prevent return movement of the inking assembly into the press until the form inking rollers have again been operatively positioned. Should the operator forget to rotate eccentric shaft 80 to cause the form inking rollers 76 and 77 to again contact the second vibrator roller 71, and should he try to slide the inking assembly into the press frame, the improvements as shown in FIGURE 10 would prevent such action. It will be observed in FIGURES 2 and 4 that the press provides an intermediate wall 126 which is disposed immediately below the inking unit, FIGURE 2. Said intermediate wall provides an upstanding flange 127 and which is adapted to have coacting relation with the side plates 78. The top edge of flange 127 is provided with a pair of notches 128 located on respective sides adjacent the frames 11 and 12 of the press. When the inking assembly is properly positioned within the frame of the press the side plates 78 are received by the notches 128. When the inking assembly is rocked on shaft 53 by releasing action of the eccentric shaft 85, the side plates automatically move out of the notches, allowing the unit to be retracted from the press. However, unless the side plates 78 are in substantial contact with the stop 83, being so positioned by actuation of the eccentric shaft 80, the pressman is prevented from returning the unit to the press, since the entering plate 78 will ride up the incline 130 provided by the flange 127 and the same will drop into the first notch 128, thus preventing further returning movement of the inking unit.

Said movement of the inking unit to an operative position within the press is facilitated by the constructional feature as shown in FIGURE 12. The member 64 has associated therewith the cam portion 131 which is of tapering formation as shown, having its high end adjacent the said member. It was previously explained that rod 66 is carried by one of the side members of the press and suitably operated by the press. Accordingly, upon returning the inking assembly to its operative position within the press, it is necessary to effect re-engagement of rod 66 with member 64. As shown in FIGURE 12 the inking assembly is retracted by moving the same in a direction towards the left. Thus, when the same is returned to the press, the rod 66 will ride the tapering cam portion 131 and in so doing re-engagement of rod 66 with member 64 automatically takes place.

What is claimed is:

1. In a printing press, the combination with a press frame including spaced side frames, of a reciprocating type form and an impression cylinder cooperating with said form, of an inking assembly for inking said type form as the same reciprocates, said assembly including spaced side members, a connecting member therebetween, an ink reservoir formed in part by the spaced side members, and the conventional rollers journalled by the side members and operative to transfer ink from the reservoir to the type form, and means mounting the inking assembly within the press frame for slidable movement as a unit to a retracted position exteriorly of the frame, said means including a shaft fixed to and extending between the spaced side frames of the press and integral walls provided by the connecting member and having slidable engagement with the fixed shaft, whereby the inking assembly when retracted from the press provides convenient access to the working parts thereof.

2. In a printing press, the combination with a press frame including spaced side frames, of a reciprocating type form and an impression cylinder cooperating with said form, of an inking assembly for inking said type form as the same reciprocates, said assembly including spaced side members, and a connecting member therebetween, and means mounting the inking assembly within the press frame for slidable movement as a unit to a retracted position exteriorly of the frame, said means including a shaft fixed to and extending between the spaced side frames of the press, said connecting member providing end walls and an intermediate partion wall, one end wall being located on the outside of one frame of the press, the other end wall being located on the inside of the other frame of the press, and said other wall and the partition wall being slidably mounted on the fixed shaft, whereby the inking assembly is slidably movable with respect to the press frame in a lateral direction.

3. In a printing press, the combination with a press frame including spaced side frames, of a reciprocating type form and an impression cylinder cooperating with said form, of an inking assembly for inking said type form as the same reciprocates, said assembly including spaced side members, a connecting channel member therebetween and disposed intermediate the members, an ink reservoir at the rear end formed in part by the spaced side members and a rear wall, and form inking rollers at the front end of the members and adapted to contact the type form, means mounting the inking assembly within the press frame for slidable movement as a unit to a retracted position exteriorly of the frame, said means including a shaft fixed to and extending between the spaced side frames of the press and integral walls provided by the connecting member and having slidable engagement with the fixed shaft, an eccentric shaft journalled by the side frames of the press and located for contact with the rear wall of the inking assembly, and a handle for rotating the eccentric shaft to adjustably position the same, whereby when the eccentric shaft is in one position the form inking rollers are caused to contact the type form and when the eccentric shaft is in another position the form inking rollers are withdrawn from the type form to permit the inking assembly to be retracted from the press.

4. In a printing press as defined by claim 3, wherein the inking assembly has rocking movement on the fixed shaft as an axis as the eccentric shaft is rotated to and from its several adjusted positions, and additionally including a locking flange fixed to the eccentric shaft, said flange engaging a side member of the inking assembly when the eccentric shaft is in position to cause the form inking rollers to contact the type form, whereby the inking assembly can be locked in operative position within the press.

5. In a printing press as defined by claim 3, additionally including an adjustable set screw carried by each side frame of the press and having contact with the journalling portion of the eccentric shaft adjacent its side frame, whereby the pressure exerted by the eccentric portion of the shaft on the rear wall having contact therewith can be adjusted by adjustment of the set screws.

6. In a printing press as defined by claim 3, additionally including a pair of side plates located within and adjacent the respective side members of the inking assembly, means pivotally mounting the side plates on the side members, said form inking rollers being journalled by the side plates, whereby the rollers are bodily movable as the side plates are caused to pivot, and a second eccentric shaft mounted for rotation in the side members of the inking assembly and adapted to contact the side plates to impart pivotal movement thereto.

7. In a printing press, the combination with a reciprocating type form and an impression cylinder cooperating therewith, of an inking assembly for inking said type form as the same reciprocates, said assembly including spaced side members, a connecting member therebetween, an ink reservoir formed in part by the spaced side members, a fountain roller for the ink reservoir, a vibrating roller journalled by the side members, a ductor roller, an oscillatable shaft for the ductor roller and which is journalled by the side members, and resilient means fixed to the shaft at one end and journalling the ductor roller at their other end, means within the press for slidably mounting the inking assembly for movement as a unit to a retracted position exteriorly of the press, and an actuating rod associated with the press and reciprocated thereby during operation of the press, said rod having an operative relation with the oscillatable shaft during press operation to oscillate the shaft and cause the ductor roller to oscillate between the fountain and vibrating rollers.

8. In a printing press as defined by claim 7, whereby the operative relation which the actuating rod has with the oscillatable shaft includes a cam member fixed to the shaft and providing a cam portion which automatically effects contact of the rod with the member as the inking assembly is returned from a retracted position to an operative position within the press.

9. In a printing press, the combination with a press frame including spaced side frames, of a reciprocating type form and an impression cylinder cooperating with said form, of an inking assembly for inking said type form as the same reciprocates, said assembly including spaced side members, a connecting channel member located substantially centrally of the side members, an ink reservoir formed in part by the spaced side members, and rollers including a pair of vibrating rollers journalled by the side members and operative to transfer ink from the reservoir to the type form, means within the press frame for mounting the inking assembly for slidable movement as a unit from an operative position within the press to a retracted position exteriorly of the press, and means for driving the vibrating rollers when the inking assembly is operatively positioned within the frame of the press, said means including a drive pinion carried by one side frame of the press, a driven pinion carried by the adjacent side member of the inking assembly and adapted to have meshing relation with the drive pinion, and other pinions fixed to the vibrating rollers respectively and meshing with the driven pinion, said drive and driven pinions on their entrance side having a formation designed to facilitate their meshing engagement when the inking assembly is moved from a retracted position to an operative position within the frame of the press.

10. In a printing press, the combination with a press frame including spaced side frames, of a reciprocating type form and an impression cylinder cooperating with said form, of an inking assembly for inking said type form as the same reciprocates, said assembly including spaced side members, a connecting channel member located substantially centrally of the side members, an ink reservoir formed in part by the spaced side members, and rollers including a vibrating roller journalled by the side members and a pair of form inking rollers for contact with the vibrating roller, said rollers being operative for transferring ink from the reservoir to the type form, means within the press frame for mounting the inking assembly for slidable movement as a unit from an operative position within the press to a retracted position exteriorly of the press, a pair of side plates located within and adjacent the respective side members of the inking assembly, means pivotally mounting the side plates on the side members, said form inking rollers being journalled by the side plates whereby the form inking rollers are bodily movable as the side plates are caused to pivot, and an eccentric shaft mounted for rotation in the side members and adapted to contact the side plates to effect pivotal movement thereof, whereby the form inking rollers can be withdrawn from contact with the vibrating roller by properly positioning the eccentric shaft, provided the inking assembly is in retracted position.

11. In a printing press, the combination with a press frame including spaced side frames, of a reciprocating type form and an impression cylinder cooperating with said form, of an inking assembly for inking said type form as the same reciprocates, said assembly including spaced side members, a connecting channel member, an ink reservoir formed in part by the spaced side members, a plurality of rollers including a fountain roller journalled by the side members and operative for transferring ink from the reservoir to the type form, means within the press frame for mounting the inking assembly for slidable movement as a unit from an operative position within the press to a retracted position exteriorly of the press, and means for intermittently rotating the fountain roller, said means including a pawl and ratchet wheel arrangement wherein the pawl is carried by a side frame of the press and the ratchet wheel is fixed to an adjacent end of the roller, a reciprocable rod carried by said side frame of the press and actuated by the press during printing operations, and means operatively connecting the rod and the pawl to cause the pawl to oscillate bodily about an axis in alignment with the axis of said roller.

12. In a printing press as defined by claim 11, wherein said fountain roller is hollow, and additionally including an adjusting shaft extending axially through the hollow fountain roller, means provided by the fountain roller at its respective ends for journalling the adjusting shaft and which projects beyond the said journalling means, a semi-circular guard plate fixed to one projecting end of the shaft and having association with the pawl to render the pawl inoperative to engage the ratchet wheel, and a handle fixed to the other projecting end of the adjusting shaft, whereby the said adjusting shaft can be rotated by the handle to angularly position the semi-circular guard plate with respect to the pawl so as to vary the degree of intermittent rotation imparted to the fountain roller.

13. In a printing press as defined by claim 11, additionally including a second pawl and ratchet wheel arrangement for manually rotating the fountain roller, said second pawl and ratchet wheel arrangement including an oscillatable member mounted by the roller at the end thereof adjacent the handle, a pawl carried by said member and a ratchet wheel fixed to said end of the roller.

14. In a printing press, the combination with a press frame, of an impression member journalled by the press frame, a form supported by the press frame for coaction with said impression member, and inking mechanism for inking said form, said inking mechanism including a frame structure, an ink reservoir and coacting rollers supported by said frame structure and having operation to convey ink from said reservoir to the form, and means mounting the frame structure within the press frame for slidable movement as a unit to a retracted position exteriorly of the press frame, said means including a shaft fixed to and extending transversely of the press frame and a connecting member forming part of the frame structure and having slidable engagement with the fixed shaft.

15. In a printing press, the combination with a press frame including spaced side frames, of a type form and an impression cylinder cooperating with said form, an inking assembly for inking said type form, said assembly including spaced side members, a connecting channel member therebetween and disposed intermediate the members, a rear wall, and form inking rollers at the front end of the members and adapted to contact the type form, means mounting the inking assembly within the press frame for slidable movement as a unit to a retracted position exteriorly of the frame, said means including a shaft fixed to and extending between the spaced side frames of the press and integral walls provided by the connecting member and having slidable engagement with the fixed shaft, an eccentric shaft journalled by the side frames of the press and located for contact with the rear wall of the inking assembly, and a handle for rotating the eccentric shaft to adjustably position the same, whereby when the eccentric shaft is in one position the form inking rollers are caused to contact the type form and when the eccentric shaft is in another position the form inking rollers are withdrawn from the type form to permit the inking assembly to be retracted from the press.

16. In a printing press as defined by claim 15, wherein the inking assembly has rocking movement on the fixed shaft as an axis as the eccentric shaft is rotated to and from its several adjusted positions, and additionally including a locking flange fixed to the eccentric shaft, said flange engaging a side member of the inking assembly when the eccentric shaft is in position to cause the form inking rollers to contact the type form, whereby the inking assembly can be locked in operative position within the press.

17. In a printing press as defined by claim 15, additionally including a pair of side plates located within and adjacent the respective side members of the inking assembly, means pivotally mounting the side plates on the side members, said form inking rollers being journalled by the side plates, whereby the rollers are bodily movable as the side plates are caused to pivot, and a second eccentric shaft mounted for rotation in the side members of the inking assembly and adapted to contact the side plates to effect pivotal movement thereof.

18. In a printing press, the combination with a press frame including spaced side frames, of a type form and an impression cylinder cooperating with said form, of an inking assembly for inking said type form, said assembly including spaced side members and a plurality of rollers including a fountain roller journalled by the side members, means within the press frame for mounting the inking assembly for slidable movement as a unit from an operative position within the press to a retracted position exteriorly of the press and means for intermittently rotating the fountain roller, said means including a pawl and ratchet wheel arrangement wherein the pawl is carried by a side frame of the press and the ratchet wheel is fixed to an adjacent end of the roller, a reciprocable rod carried by said side frame of the press and actuated by the press during printing operations, and means operatively connecting the rod and the pawl to cause the pawl to oscillate bodily about an axis in alignment with the axis of said roller.

19. In a printing press having a main frame, an impression member and a type form mounted for coaction with said impression member, the provision of a retractable inking assembly for inking said form comprising an auxiliary frame for supporting said inking assembly, manual control means mounted in the main frame and having operation to move said auxiliary frame and therewith the inking assembly between an inking position and a non-inking position with respect to the form, additional means mounting said auxiliary frame for lateral movement when the assembly is in the non-inking position between an operative position within the main frame and an inoperative position exteriorly of the main frame, and locking means mounted on the main frame and having coaction with the auxiliary frame to lock the assembly against lateral movement when said assembly is in its operative, inking position.

20. In a printing press having a main frame, an impression member and a form mounted for coaction with said impression member, the provision of an inking assembly for inking said form, comprising an auxiliary frame structure, an ink fountain and a series of ink distributing rollers mounted in said auxiliary frame structure and having operation to convey ink from the fountain to said form, the respective rollers being set with a predetermined pressure therebetween, means mounting said auxiliary frame structure for lateral movement between an operative position within the main frame and an inoperative position exteriorly of said main frame, manually operable means on said auxiliary frame structure for relieving the pressure between the respective coacting rollers when the assembly is in said inoperative position, and safety means including a member on said auxiliary frame and coacting means on said main frame for preventing return of said assembly to said operative position when the pressure relation between the coacting rollers is relieved.

21. In a printing press having a main frame, an impression member and a form mounted for coaction with the impression member, the provision of a retractable inking assembly for inking said form, said assembly comprising an auxiliary frame, an ink fountain, and a series of ink distributing rollers including an oscillatable ductor roller mounted in said auxiliary frame and having operation to convey ink from the fountain to the form, drive means for oscillating said ductor roller including a drive member mounted on the main frame and a driven member carried by said auxiliary frame, means mounting the auxiliary frame and therewith said inking assembly for lateral movement with respect to the form between an operative position within the main frame and an inoperative position exteriorly of the main frame, and means included in said drive means for effecting automatic engagement and disengagement of said drive and driven members upon movement of the assembly between said operative and inoperative positions respectively.

22. In a printing press having a main frame, an impression member and a form mounted for coaction with the impression member, the provision of a retractable inking assembly for inking said form comprising an auxiliary frame, an ink fountain and a coacting rotatable fountain roller mounted in said auxiliary frame, drive means for imparting rotary motion to the fountain roller including a drive member mounted on the main frame and a driven member mounted on said roller, means mounted in the main frame and having coaction with the auxiliary frame to move said inking assembly between an inking position and a non-inking position with respect to said form and whereby said drive and driven members are automatically engaged and disengaged respectively, and additional means mounting said auxiliary frame and therewith said inking assembly for lateral movement with respect to the form between an operative position within the main frame and an inoperative position exteriorly of the main frame when said assembly is in the non-inking position.

References Cited in the file of this patent

UNITED STATES PATENTS

| | | |
|---|---|---|
| 675,024 | Sonntag | May 28, 1901 |
| 967,985 | Sheldon | Aug. 23, 1910 |
| 1,031,311 | Zeitz | July 2, 1912 |
| 1,496,455 | Dudley | June 3, 1924 |
| 1,719,148 | Vickers | July 2, 1929 |
| 2,166,271 | Storck | July 18, 1939 |
| 2,708,874 | Schultz | May 24, 1955 |
| 2,845,864 | Davidson | Aug. 5, 1958 |
| 2,933,038 | Thut et al. | Apr. 19, 1960 |